(12) United States Patent
Johnson et al.

(10) Patent No.: US 7,160,639 B2
(45) Date of Patent: Jan. 9, 2007

(54) JOHNSON REVERSIBLE ENGINE

(75) Inventors: Lonnie G. Johnson, Atlanta, GA (US); James R. Muller, Decatur, GA (US)

(73) Assignee: Johnson Research & Development Co., Inc., Atlanta, GA (US)

( * ) Notice: Subject to any disclaimer, the term of this patent is extended or adjusted under 35 U.S.C. 154(b) by 632 days.

(21) Appl. No.: 10/425,067

(22) Filed: Apr. 28, 2003

(65) Prior Publication Data

US 2003/0203276 A1 Oct. 30, 2003

Related U.S. Application Data

(63) Continuation-in-part of application No. 09/627,721, filed on Jul. 28, 2000, now abandoned.

(51) Int. Cl.
*H01M 8/04* (2006.01)

(52) U.S. Cl. .............. 429/25; 429/11; 429/50; 429/101; 429/112; 429/24; 429/120

(58) Field of Classification Search .............. 429/25
See application file for complete search history.

(56) References Cited

U.S. PATENT DOCUMENTS

| 4,040,410 A | 8/1977 | Libowitz ............... 126/270 |
| 4,049,877 A | 9/1977 | Saillant et al. ............. 429/11 |
| 4,098,958 A | 7/1978 | Bettman ............... 429/17 |
| 4,422,500 A | 12/1983 | Nishizaki et al. ...... 165/104.12 |
| 4,523,635 A | 6/1985 | Nishizaki et al. ...... 165/104.12 |
| 4,677,038 A * | 6/1987 | Salomon ............... 429/11 |
| 4,692,390 A | 9/1987 | Roy ............... 429/17 |
| 4,781,029 A | 11/1988 | SerVaas ............... 60/641.7 |
| 4,818,638 A | 4/1989 | Roy ............... 429/20 |
| 5,139,895 A | 8/1992 | Roy et al. ............... 429/17 |
| 5,928,436 A | 7/1999 | Borkowski et al. ......... 136/205 |

FOREIGN PATENT DOCUMENTS

| EP | 0 055 855 A2 | 7/1982 |
| EP | 0 071 271 A2 | 2/1983 |
| EP | 0 168 062 A2 | 1/1986 |

OTHER PUBLICATIONS

Feldman, K.T. et. al., A new absorption heat pump, ASHRAE Transactions, 1998, 104, Career and Technical Education, pp. 1427-1433.*

* cited by examiner

*Primary Examiner*—Patrick Joseph Ryan
*Assistant Examiner*—Cynthia Lee
(74) *Attorney, Agent, or Firm*—Baker Donelson

(57) ABSTRACT

An reversible engine (10) is disclosed having a conduit system (11), a first electrochemical cells (12), and a second electrochemical cell (13). The conduit system (11) includes a first conduit (15) extending from the first electrochemical cell (12) to the second electrochemical cell (13), and a second conduit (16) extending from the second electrochemical cell (13) to the first electrochemical cell (12). The heat engine (10) also includes a heater (18) mounted in thermal communication with the conduit system (11) adjacent the second electrochemical cell (13), a cooler (19) mounted in thermal communication with the conduit system (11) adjacent the first electrochemical cell (12), and a regenerative heat exchanger (20) thermally coupled to the first and second conduits (15) and (16) for the transfer of heat therebetween.

10 Claims, 2 Drawing Sheets

JOHNSON REVERSIBLE ENGINE

REFERENCE TO RELATED APPLICATION

This is a continuation-in-part of U.S. patent application Ser. No. 09/627,721, filed Jul. 28, 2000 now abandoned.

TECHNICAL FIELD

This invention relates to the conversion of heat energy to electrical energy or electrical energy to heat energy utilizing a reversible engine having a pair of electrochemical cells.

BACKGROUND OF THE INVENTION

The conversion of heat energy or chemical energy to electrical energy, or visa-versa, may be accomplished in a variety of ways. It is known that electrochemical cells or batteries rely on redox reactions wherein electrons from a reactant being oxidized are transferred to a reactant being reduced. With the separation of the reactants from each other, it is possible to cause the electrons to flow through an external circuit where they can be used to perform work.

Electrochemical cells however have had a problem of exhausting the reactants. Although cells can be designed to be recharged by applying a reverse polarity voltage across the electrodes, such recharging requires a separate electrical source. During the recharging of the cell the cell typically is not usable.

Fuel cells have been developed in an effort to overcome problems associated with electrochemical cells. Typically, fuel cells operate by passing an ionized species across a selective electrolyte which blocks the passage of the non-ionized species. By placing porous electrodes on either side of the electrolyte, a current may be induced in an external circuit connecting the electrodes. The most common type of fuel cell is a hydrogen-oxygen fuel cell which passes hydrogen through one of the electrodes while oxygen is passed through the other electrode. The hydrogen and oxygen combine at the electrolyte-electrode interface to produce water. By continuously removing the water, a concentration gradient is maintained to induce the flow of hydrogen and oxygen to the cell.

These types of fuel cells however suffer from a number of disadvantages. These cells must be continuously supplied with a reactant in order to produce electricity continuously. Additionally, these cells produce a continuous product stream which must be removed, the removal of which may pose a problem. The porous electrodes of these fuel cells must allow the passage of the reactant entering the cell. However, over time these porous electrodes can become fouled or plugged so as to slow or even prevent the passage of the reactant. Such slowing of the reactant flow reduces the production of electricity. Lastly, the selection of an appropriate electrolyte is not always easy. The electrolyte must rapidly transport the ionized species in order to increase the current production. Frequently, the limited migration of the ionized species through the electrolyte is a limiting factor on the amount of current produced.

In an effort to avoid the problems inherent with the previously described fuel cells, thermoelectric conversion cells have been designed. These thermoelectric conversion cells utilize heat to produce a pressure gradient to induce the flow of a reactant, such as molten sodium, across a solid electrolyte. A current is generated as sodium atoms lose electrons upon entering the electrolyte and gain electrons upon leaving the electrolyte. These cells however also suffer from the plugging of the porous electrodes required to pass the sodium ions. Furthermore, the diffusion of the sodium ions through the solid electrolytes has proven to be slow, thereby limiting the amount of current produced by the cell. These cells also utilize alkali metals which is difficult to use in these types of applications because of they are highly corrosive. Lastly, these types of fuel cells operate at extremely high temperatures, typically in a range between 1,200–1,500 degrees Kelvin, thus making them impractical for many uses.

Accordingly, it is seen that a need remains for an electrochemical conversion system that does not require a continuous source of reactant, which does not require an electrolyte which may be plugged over time and which may be operated at relatively low temperatures. It is the provision of such therefore that the present invention is primarily directed.

SUMMARY OF THE INVENTION

In a preferred form of the invention a reversible engine comprises a first electrochemical cell, a second electrochemical cell and a conduit system. The first electrochemical cell has a first ion conductive material, a first electrode mounted upon one side of the first ion conductive material, a second electrode mounted upon one side of the first ion conductive material opposite the first electrode. The second electrochemical cell has a second ion conductive material, a third electrode mounted upon one side of the second ion conductive material, and a fourth electrode mounted upon one side of the second ion conductive material opposite the third electrode. The conduit system has a first conduit and a second conduit. The first conduit has one end in fluid communication with the first electrochemical cell second electrode and a second end in fluid communication with the second electrochemical cell third electrode. The second conduit has one end in fluid communication with the second electrochemical cell fourth electrode and a second end in fluid communication with the first electrochemical cell first electrode. The heat engine also has heating means for transferring heat to the conduit system adjacent the second electrochemical cell, cooling means for transferring heat from the conduit system adjacent the first electrochemical cell, and a supply of ionizable gas contained within the conduit system. With this construction and with the passage of a current through the first electrochemical cell the ionizable gas is forced through the first electrochemical cell thereby increasing the pressure within the first conduit while simultaneously decreasing the pressure within the second conduit, whereby the resulting pressure differential between the first conduit and the second conduit causes the ionizable gas to pass through the second electrochemical cell thus creating an electric potential difference between its first and second electrodes.

DETAILED DESCRIPTION

Figure 1:
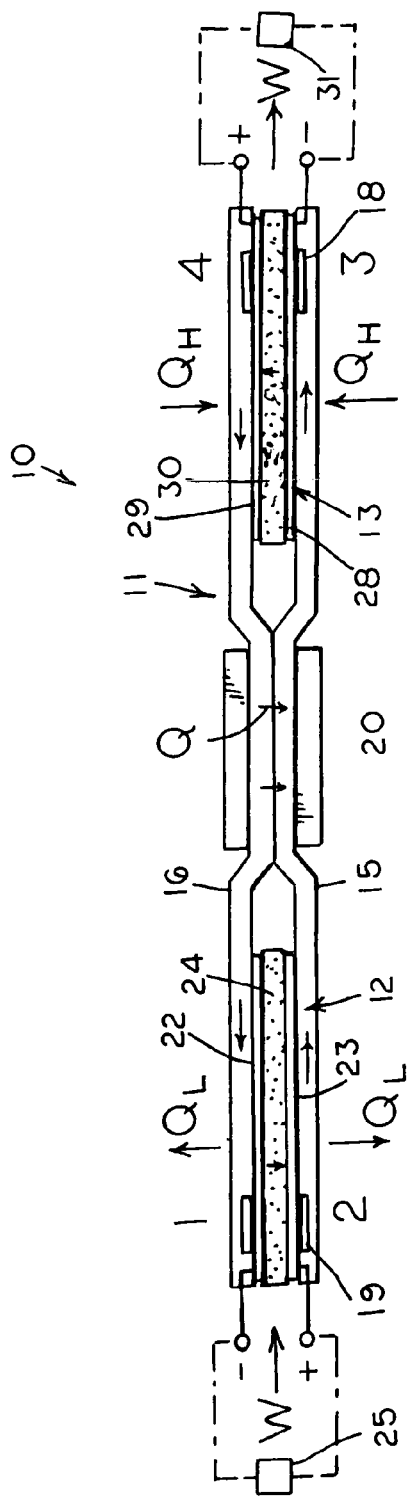
FIG. 1 is a schematic view of a reversible heat engine in a preferred form of the invention, shown in a heat engine configuration.

With reference next to the drawings, there is shown in FIG. 1 a reversible engine 10 in a preferred form of the invention of a heat engine. The engine 10 has a conduit system 11, a first electrochemical cells 12, and a second electrochemical cell 13. The conduit system 11 is made of a non-reactive material such as stainless steel. The conduit system 11 includes a first conduit 15 extending from the first electrochemical cell 12 to the second electrochemical cell 13, and a second conduit 16 extending from the second electrochemical cell 13 to the first electrochemical cell 12.

The heat engine 10 also includes a heater 18 mounted in thermal communication with the conduit system 11 adjacent the second electrochemical cell 13, a cooler 19 mounted in thermal communication with the conduit system 11 adjacent the first electrochemical cell 12, and a heat regenerator or exchanger 20 thermally coupled to the first and second conduits 15 and 16 for the transfer of heat therebetween.

The first electrochemical cell 12 has a first gas diffusion electrode 22, a second gas diffusion electrode 23 and a first proton conductive membrane 24, such as Nafion® made by E.I. du Pont de Nemours, mounted between the first and second gas diffusion electrodes 22 and 23. This type of electrochemical cell is available from E-Tek, Inc. of Somerset, N.J. The electrochemical cell electrodes 22 and 23 are electrically coupled to an external power supply 25.

Similarly, the second electrochemical cell 13 has a third gas diffusion electrode 28, a fourth gas diffusion electrode 29 and a second proton conductive membrane 30 mounted between the third and fourth gas diffusion electrodes 28 and 29. The electrochemical cell electrodes 28 and 29 are electrically coupled to an external load 31.

In use, the conduit system 11 is filled with an ionizable gas, such as hydrogen, oxygen or sodium hereinafter referred to simply as hydrogen H. With the operation of the heater 18 ($Q_H$) to transfer heat energy to the second electrochemical cell 13, or adjacent thereto, to maintain a constant temperature of the hydrogen gas ionized and passed therethrough, the operation of cooler 19 ($Q_L$) to transfer heat energy from, or from adjacent thereto, the first electrochemical cell 12, and the operation of the heat exchanger 20 to transfer heat energy from the hydrogen gas within the second conduit 16 to the hydrogen gas within the first conduit 15, and the passage of an electric current from the external power supply 25 to the first electrochemical cell 12, hydrogen gas H passes through the first electrochemical cell 12. The hydrogen gas H passes through the first electrochemical cell 12 as a result of the electric potential from the external power supply 25 between the first electrode 22 and the second electrode 23. The electric potential causes the hydrogen gas at the first electrode 22 to oxidize into hydrogen protons. The oxidation of the hydrogen gas causes the release of electrons which are passed to the second electrode 23. The hydrogen protons are drawn through the first proton conductive membrane 24 to the second electrode 23 by the negative charge at the second electrode 23. At the second electrode 23 the hydrogen protons are reduced into hydrogen gas. As such, the electric current through the first electrochemical cell 12 forces the passage of hydrogen gas from the second conduit 16 to the first conduit 15, thereby increasing the hydrogen gas pressure within the first conduit 15 while decreasing the hydrogen gas pressure within the second conduit 16, i.e. creating a hydrogen gas pressure differential between the second conduit 16 and the first conduit 15.

The passage of hydrogen gas H from the second conduit 16 to the first conduit 15 causes a pressure differential across the second electrochemical cell 13. As the hydrogen pressure differential between the first and second conduits 15 and 16 increases an electrical potential across the second electrochemical cell 13 is created and progressively increased. Hydrogen gas H at the higher pressure first conduit 15 adjacent the second electrochemical cell third electrode 28 is oxidized into hydrogen protons. These hydrogen protons are forced by the hydrogen pressure differential through the second proton conductive membrane 30 to the fourth electrode 29 at the lower pressure second conduit 16. At the fourth electrode 29 the hydrogen protons are reduced into hydrogen gas. As such, the oxidation of the hydrogen gas causes the release of electrons which are passed to the third electrode 28 while the reduction of protons into hydrogen gas causes the acceptance or receiving of electrons from the fourth electrode 29, thereby inducing an electric current through load 31 coupled to the second electrochemical cell 13.

The passage of hydrogen gas through the first and second electrochemical cells 12 and 13 creates a fluid stream or flow through the conduit system 11 as illustrated by the direction arrows in the drawings. The flow of hydrogen gas through the first conduit 15 from adjacent the first electrochemical cell 12 to adjacent the second electrochemical cell 13 is done so under constant pressure while the temperature of the gas increases. Similarly, the flow of hydrogen gas through the second conduit 16 from adjacent the second electrochemical cell 13 to adjacent the first electrochemical cell 12 is done so under constant pressure while the temperature decreases.

It should be understood that it takes less work to transfer the hydrogen gas across the first electrochemical cell from the low pressure region to the high pressure region at a low temperature than the work required to transfer the hydrogen gas across the second electrochemical cell from the high pressure region to the low pressure region at a high temperature. As such, the work input at the first electrochemical cell is less than the work output at the second electrochemical cell, with the additional work output energy being obtained from the conversion of the heat energy input ($Q_H$). The transfer of heat through the heat exchanger 20 aids in maintaining a temperature differential between the regions of the conduit system surrounding the two electrochemical cells 12 and 13 and thereby aid in maintaining a constant pressure during the process, and in improving the efficiency by conserving the heat energy within the system by transferring it from the high temperature gas leaving the high temperature region adjacent the second electrochemical cell to the lower temperature gas flowing to the first electrochemical cell.

Figure 2:
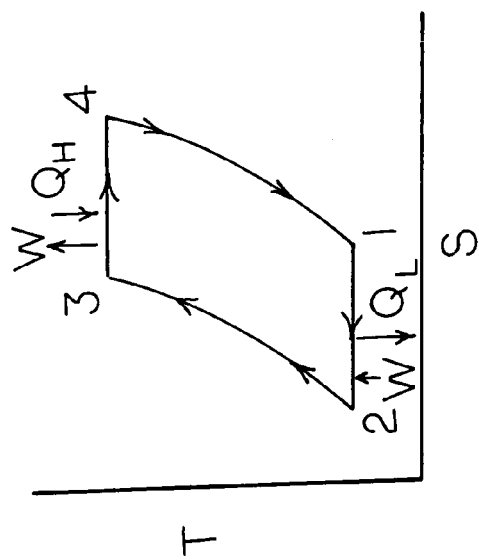
FIG. 2 is a theoretical, temperature entropy diagram of the reversible heat engine of FIG. 1.

The entropy diagram shown in FIG. 2 illustrates the theoretical change in entropy of the just described system during its operation in an ideal or perfect situation wherein the heat exchange is ideal or 100 percent efficient, i.e., wherein outside influences on the system are not considered obviously, the true entropy diagram of the system will be different once these outside influences are taken into consideration.

Figure 3:
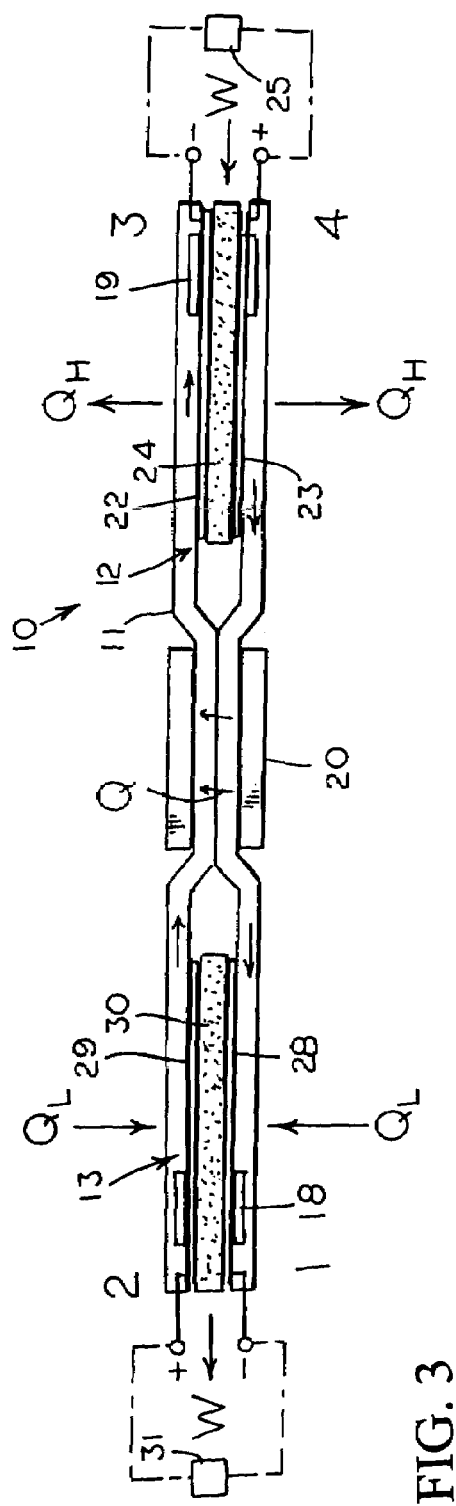
FIG. 3 is a schematic view of a reversible heat engine in a preferred form of the invention, shown in a heat pump configuration.
Figure 4:
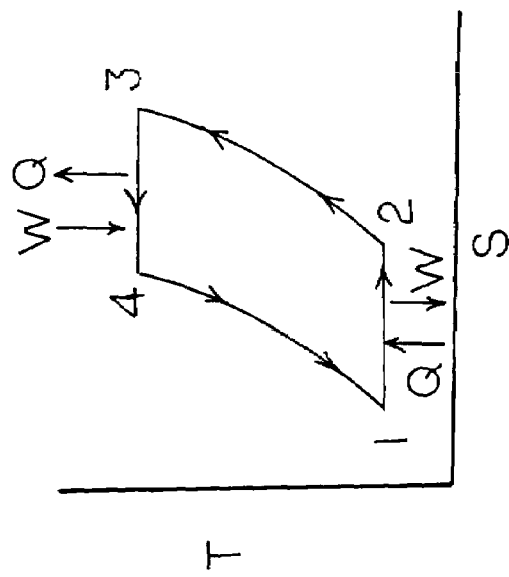
FIG. 4 is a temperature entropy diagram of the reversible heat engine of FIG. 3.

The system may also be operated in a reverse cycle as a heat pump, as shown in FIGS. 3 and 4. Here, the second electrochemical cell 13 is coupled to an external power supply 25 while the first electrochemical cell 12 is coupled to an external load 31. Also, the region adjacent the first electrochemical cell 12 is provided with heat energy ($Q_L$) by while heat energy is extracted ($Q_H$) from the region adjacent the second electrochemical cell 13. The operation of the device in this configuration is the extraction of heat energy ($Q_L$) from a low temperature source and supply it as heat energy ($Q_H$) to a higher temperature source, as illustrated in FIG. 3. The principles of the invention however remain the same as those previously described, with the system here providing a change in the heat energy.

The system may be operated at relatively small temperatures differences. As such, this system is both safe and manageable. Furthermore, this system converts energy without any mechanically moving parts, and as such is practically free of mechanical failure.

It should be understood that the previously described systems may utilize any form of heat source such as electric heaters, gas burning heaters, heated air, radiation heat sources, radiant heaters or other conventionally known means of producing heat. The system may also utilize any form of cooling means such as cooling water jackets, heat sinks, cooling radiators, heat dissipaters or another other conventionally known means of removing heat.

It thus is seen that a reversible engine is now provided which is efficient and which may be operated over relatively low temperature differences. It should of course be understood that many modifications, in addition to those specifically recited herein, may be made to the specific embodiments described herein without departure from the spirit and scope of the invention as set forth in the following claims.

The invention claimed is:

1. A engine comprising:
a first electrochemical cell having a first ion conductive material, a first electrode mounted upon one side of said first ion conductive material, and a second electrode mounted upon one side of said first ion conductive material opposite said first electrode;
a second electrochemical cell having a second ion conductive material, a third electrode mounted upon one side of said second ion conductive material, and a fourth electrode mounted upon one side of said second ion conductive material opposite said third electrode;
a conduit system having a first conduit and a second conduit, said first conduit having one end in fluid communication with said first electrochemical cell second electrode and a second end in fluid communication with said second electrochemical cell third electrode, said second conduit having one end in fluid communication with said second electrochemical cell fourth electrode and a second end in fluid communication with said first electrochemical cell first electrode;
heating means for transferring heat to said second electrochemical cell;
cooling means for transferring heat from said first electrochemical cell; and
a supply of ionizable gas contained within said conduit system,
whereby with the passage of a current through the first electrochemical cell the ionizable gas is forced through the first electrochemical cell thereby increasing the pressure within the first conduit while simultaneously decreasing the pressure within the second conduit, and whereby the resulting pressure differential between the first conduit and the second conduit causes the ionizable gas to pass through the second electrochemical cell thus creating an electric potential difference between its first and second electrodes.

2. The engine of claim 1 wherein said first and second ion conductive materials are proton conductive membranes.

3. The engine of claim 1 wherein said ionizable gas is selected from a group consisting of oxygen, hydrogen and sodium.

4. The engine of claim 1 further comprising heat exchanger means for transferring heat from said second conduit to said first conduit.

5. The engine of claim 1 further comprising a heat exchanger thermally coupled to said first and second conduits, whereby the heat exchanger transfers heat from the second conduit to the first conduit.

6. An engine comprising:
a first electrochemical cell;
a second electrochemical cell;
a closed loop conduit system, said conduit system having a first conduit extending from said first electrochemical cell to said second electrochemical cell and a second conduit extending from said second electrochemical cell to said first electrochemical cell;
heating means for transferring heat to said second electrochemical cell;
cooling means for transferring heat from said first electrochemical cell; and
a supply of ionizable gas contained within said conduit system,
whereby with the passage of a current through the first electrochemical cell the ionizable gas is forced through the first electrochemical cell thereby increasing the pressure within the first conduit while simultaneously decreasing the pressure within the second conduit, and whereby the resulting pressure differential between the first conduit and the second conduit causes the ionizable gas to pass through the second electrochemical cell thus creating an electric potential difference between its first and second electrodes.

7. The engine of claim 6 wherein said ion conductive materials are proton conductive membranes.

8. The engine of claim 6 wherein said ionizable gas is selected from a group consisting of oxygen, hydrogen and sodium.

9. The engine of claim 6 further comprising heat exchanger means for transferring heat from said second conduit to said first conduit.

10. The engine of claim 6 further comprising a heat exchanger thermally coupled to said first and second conduits, whereby the heat exchanger transfers heat from the second conduit to the first conduit.

* * * * *